United States Patent
Lu et al.

(10) Patent No.: US 11,630,760 B2
(45) Date of Patent: *Apr. 18, 2023

(54) SYSTEM, METHOD, AND COMPUTER PROGRAM PRODUCT FOR OPERATING DYNAMIC SHADOW TESTING ENVIRONMENTS

(71) Applicant: Visa International Service Association, San Francisco, CA (US)

(72) Inventors: Ranglin Lu, Austin, TX (US); Yu Gu, Austin, TX (US); Yinhe Cheng, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,902

(22) Filed: Jan. 5, 2022

(65) Prior Publication Data

US 2022/0129368 A1 Apr. 28, 2022

Related U.S. Application Data

(63) Continuation of application No. 16/658,840, filed on Oct. 21, 2019, now Pat. No. 11,249,882.

(51) Int. Cl.
*G06F 9/44* (2018.01)
*G06F 11/36* (2006.01)
(Continued)

(52) U.S. Cl.
CPC ........ *G06F 11/3664* (2013.01); *G06F 11/362* (2013.01); *G06F 11/3696* (2013.01); *G06N 20/00* (2019.01); *G06Q 20/108* (2013.01)

(58) Field of Classification Search
CPC .................................................. G06F 11/3664
(Continued)

(56) References Cited

U.S. PATENT DOCUMENTS 7,813,822 B1 * 10/2010 Hoffberg ................ H04N 7/163
                                                                381/73.1
8,893,138 B2    11/2014 Arnold et al.
(Continued)

*Primary Examiner* — Evral E Bodden
(74) *Attorney, Agent, or Firm* — The Webb Law Firm

(57) ABSTRACT

Described are a system, method, and computer program product for operating dynamic shadow testing environments for machine-learning models. The method includes storing a testing policy including an identifier of a machine-learning model and an identifier of a transaction service. The method includes generating a shadow testing environment operating the transaction service using the machine-learning model. The method also includes receiving, at a transaction service provider system, a transaction authorization request including transaction data of a transaction associated with a payment device. The method further includes identifying the machine-learning model associated with the transaction based on a parameter of the transaction data. The method further includes determining, based on the identifier of the machine-learning model, the testing policy and the shadow testing environment. The method further includes replicating the transaction data in the shadow testing environment as input for testing the transaction service using the machine-learning model.

20 Claims, 5 Drawing Sheets

(51) Int. Cl.
  *G06N 20/00* (2019.01)
  *G06Q 20/10* (2012.01)
(58) Field of Classification Search
  USPC .......................................................... 717/124
  See application file for complete search history.

(56) References Cited

U.S. PATENT DOCUMENTS

| | | | |
|---|---|---|---|
| 8,990,778 B1* | 3/2015 | Allocca | G06F 11/3692 |
| | | | 717/126 |
| 9,799,003 B2 | 10/2017 | Doran et al. | |
| 2003/0142855 A1* | 7/2003 | Kuo | G07C 9/24 |
| | | | 382/119 |
| 2009/0327140 A1 | 12/2009 | Kuo | |
| 2015/0227268 A1* | 8/2015 | Rathod | H04L 51/48 |
| | | | 715/739 |

* cited by examiner

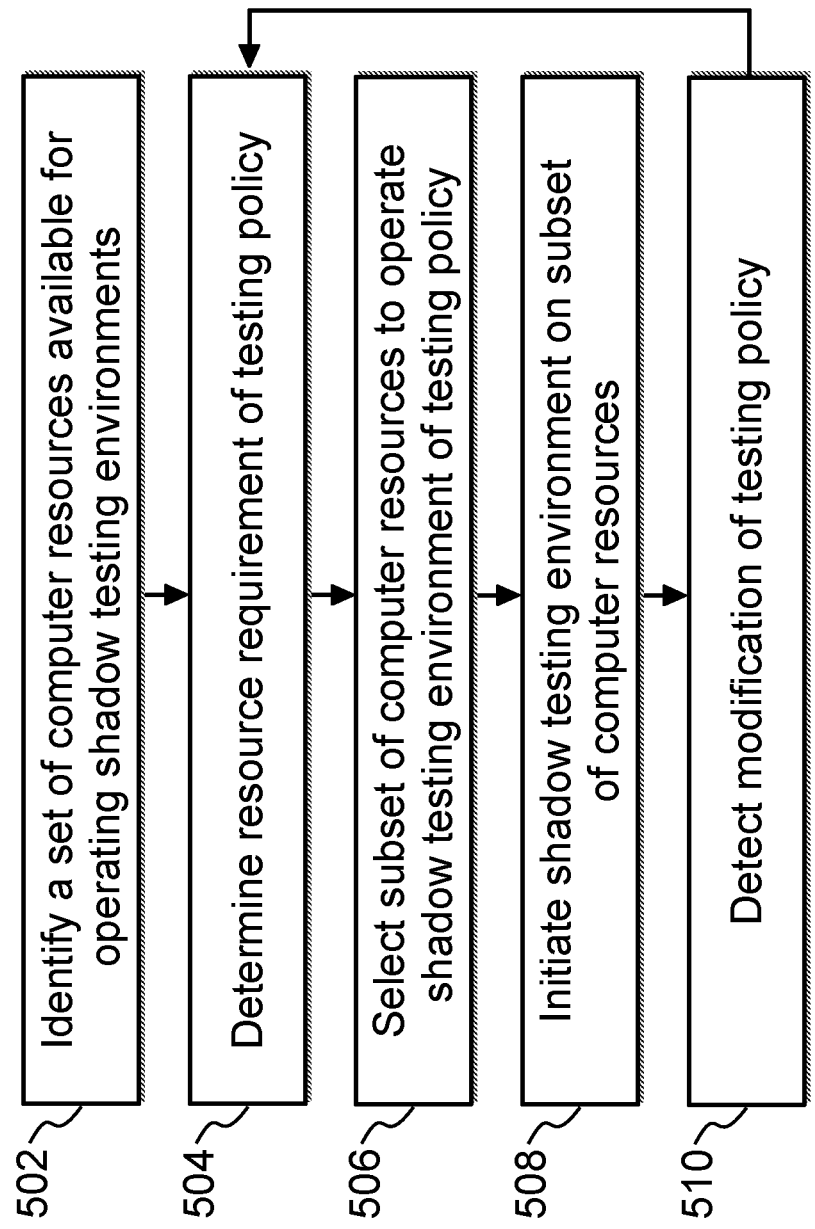

SYSTEM, METHOD, AND COMPUTER PROGRAM PRODUCT FOR OPERATING DYNAMIC SHADOW TESTING ENVIRONMENTS

CROSS-REFERENCE TO RELATED APPLICATIONS

This application is a continuation of U.S. patent application Ser. No. 16/658,840, filed Oct. 21, 2019, entitled "System, Method, and Computer Program Product for Operating Dynamic Shadow Testing Environments," the disclosure of which is hereby incorporated by reference in its entirety.

BACKGROUND

1. Technical Field

Disclosed embodiments or aspects relate generally to networked computer service analysis, and, in one particular embodiment or aspect, to a system, method, and computer program product for operating dynamic shadow testing environments replicating live data for services using machine-learning models.

2. Technical Considerations

Testing a computer service prior to live deployment on production data can be a difficult process. Duplicating a historic set of data may not properly replicate the flow and timing that certain computer services may require from a stream of live data. Conversely, testing computer services on live data may create unnecessary risk from accidental data overwriting or triggered service actions. Creating a test environment that mimics the flow of live data can be a very labor-intensive, manual process of setup, resource allocation, and generation. Even after a test environment is established, iterative testing of a service remains ad hoc, leading to inefficient redeployment after a service or underlying model is modified. In short, operating test environments for services that are to be deployed on live data is a slow, inefficient, and inelastic process relative to computer processing requirements, data integrity, and testing accuracy. The deficiencies of live data service testing is particularly apparent for electronic payment processing networks that require extensive and thorough testing of transaction services prior to deployment.

There is a need in the art for a technical solution that dynamically generates and operates shadow testing environments for live data, particularly live transaction data processed at a transaction service provider system. There is a need for such a technical solution to provide automatic replication of data in relevant shadow testing environments, where testing policies can be set and modified during runtime, with efficient identification and allocation of computer resources.

SUMMARY

Accordingly, and generally, provided is an improved system, method, and computer program product for operating dynamic shadow testing environments. The method may include storing a testing policy including identifiers of a machine-learning model and a transaction service. The method may also include generating a shadow testing environment operating the transaction service using the machine-learning model and receiving a transaction authorization request including transaction data. The method may further include identifying the machine-learning model associated with the transaction based on a parameter of the transaction data and determining, based on the identifier of the machine-learning model, the shadow testing environment. The method may further include replicating the transaction data in the shadow testing environment as input for testing the transaction service using the machine-learning model.

According to non-limiting embodiments or aspects, provided is a computer-implemented method for operating dynamic shadow testing environments. The method may include storing, with at least one processor and in a database, at least one testing policy including an identifier of at least one machine-learning model and an identifier of at least one transaction service. The method may also include generating, with at least one processor, at least one shadow testing environment operating the at least one transaction service using the at least one machine-learning model. The method may further include receiving, with at least one processor at a transaction service provider system, at least one transaction authorization request including transaction data of at least one transaction associated with at least one payment device. The method may further include identifying, with at least one processor, the at least one transaction service associated with the at least one transaction based on a parameter of the transaction data. The method may further include determining, with at least one processor, the at least one shadow testing environment associated with the at least one transaction service. The method may further include replicating, with at least one processor, the transaction data in the at least one shadow testing environment as input for testing the at least one transaction service using the at least one machine-learning model.

In some non-limiting embodiments or aspects, the method may include detecting, with at least one processor, a modification of the at least one testing policy by a user through a computer interface. The method may also include determining, with at least one processor, that the modification includes a new identifier of at least one new machine-learning model and/or a new identifier of at least one new transaction service. The method may further include regenerating, with at least one processor, the at least one shadow testing environment to operate the at least one new transaction service and/or use the at least one new machine-learning model.

In some non-limiting embodiments or aspects, the method may include, in response to determining that the at least one new transaction service and/or the at least one new machine-learning model has not yet been stored, prompting, with at least one processor, the user through the computer interface to provide the at least one new transaction service and/or the at least one new machine-learning model.

In some non-limiting embodiments or aspects, the method may include receiving, with at least one processor at a transaction service provider system, a plurality of transaction authorization requests including the at least one transaction authorization request. The method may also include replicating, with at least one processor in a respective shadow testing environment of the at least one shadow testing environment, each of the plurality of transaction authorization requests that is associated with a transaction service of the at least one testing policy.

In some non-limiting embodiments or aspects, replication of a given transaction authorization request occurs in real-time with processing of the given transaction authorization request by the transaction service provider system.

In some non-limiting embodiments or aspects, generating the at least one shadow testing environment may include identifying, with at least one processor, a set of computer resources available for operating shadow testing environments. Generating the at least one shadow testing environment may also include determining, with at least one processor, a resource requirement of the at least one testing policy. Generating the at least one shadow testing environment may further include selecting, with at least one processor based at least partly on the resource requirement, a subset of computer resources to operate the at least one shadow testing environment. Generating the at least one shadow testing environment may further include initiating, with at least one processor, the at least one shadow testing environment using the subset of computer resources.

In some non-limiting embodiments or aspects, the method may include, in response to detecting a modification of the at least one testing policy, determining, with at least one processor and based on the modification, a new resource requirement of the at least one testing policy. The method may also include selecting, with at least one processor based at least partly on the new resource requirement, a new subset of computer resources to operate the at least one shadow testing environment. The method may further include initiating, with at least one processor, the at least one shadow testing environment using the new subset of computer resources.

According to non-limiting embodiments or aspects, provided is a system operating dynamic shadow testing environments. The system may include a server including at least one processor. The server may be programmed and/or configured to store, in a database, at least one testing policy including an identifier of at least one machine-learning model and an identifier of at least one transaction service. The server may also be programmed and/or configured to generate at least one shadow testing environment operating the at least one transaction service using the at least one machine-learning model. The server may further be programmed and/or configured to receive, at a transaction service provider system, at least one transaction authorization request including transaction data of at least one transaction associated with at least one payment device. The server may further be programmed and/or configured to identify the at least one transaction service associated with the at least one transaction based on a parameter of the transaction data. The server may also be programmed and/or configured to determine the at least one shadow testing environment associated with the at least one transaction service. The server may also be programmed and/or configured to replicate the transaction data in the at least one shadow testing environment as input for testing the at least one transaction service using the at least one machine-learning model.

In some non-limiting embodiments or aspects, the server may be further programmed and/or configured to detect a modification of the at least one testing policy by a user through a computer interface. The server may also be further programmed and/or configured to determine that the modification includes a new identifier of at least one new machine-learning model and/or a new identifier of at least one new transaction service. The server may be further programmed and/or configured to regenerate the at least one shadow testing environment to operate the at least one new transaction service and/or use the at least one new machine-learning model.

In some non-limiting embodiments or aspects, the server may be further programmed and/or configured to, in response to determining that the at least one new transaction service and/or the at least one new machine-learning model has not yet been stored, prompt the user through the computer interface to provide the at least one new transaction service and/or the at least one new machine-learning model.

In some non-limiting embodiments or aspects, the server may be programmed and/or configured to receive, at a transaction service provider system, a plurality of transaction authorization requests including the at least one transaction authorization request. The server may also be further programmed and/or configured to replicate, in a respective shadow testing environment of the at least one shadow testing environment, each of the plurality of transaction authorization requests that is associated with a transaction service of the at least one testing policy.

In some non-limiting embodiments or aspects, replication of a given transaction authorization request occurs in real-time with processing of the given transaction authorization request by the transaction service provider system.

In some non-limiting embodiments or aspects, generating the at least one shadow testing environment may include identifying a set of computer resources available for operating shadow testing environments. Generating the at least one shadow testing environment may also include determining a resource requirement of the at least one testing policy. Generating the at least one shadow testing environment may further include selecting, based at least partly on the resource requirement, a subset of computer resources to operate the at least one shadow testing environment. Generating the at least one shadow testing environment may further include initiating the at least one shadow testing environment using the subset of computer resources.

In some non-limiting embodiments or aspects, the server may be programmed and/or configured to, in response to detecting a modification of the at least one testing policy, determine, based on the modification, a new resource requirement of the at least one testing policy. The server may also be programmed and/or configured to select, based at least partly on the new resource requirement, a new subset of computer resources to operate the at least one shadow testing environment. The server may further be programmed and/or configured to initiate the at least one shadow testing environment using the new subset of computer resources.

According to non-limiting embodiments or aspects, provided is a computer program product for operating dynamic shadow testing environments. The computer program product may include at least one non-transitory computer-readable medium including program instructions that, when executed by at least one processor, cause the at least one processor to store, in a database, at least one testing policy including an identifier of at least one machine-learning model and an identifier of at least one transaction service. The program instructions may further cause the at least one processor to generate at least one shadow testing environment operating the at least one transaction service using the at least one machine-learning model. The program instructions may further cause the at least one processor to receive, at a transaction service provider system, at least one transaction authorization request including transaction data of at least one transaction associated with at least one payment device. The program instructions may further cause the at least one processor to identify the at least one transaction service associated with the at least one transaction based on a parameter of the transaction data. The program instructions may further cause the at least one processor to determine the at least one shadow testing environment associated with the at least one transaction service. The program instructions may further cause the at least one processor to replicate the transaction data in the at least one shadow testing environment as input for testing the at least one transaction service using the at least one machine-learning model.

In some non-limiting embodiments or aspects, the program instructions may cause the at least one processor to detect a modification of the at least one testing policy by a user through a computer interface. The program instructions may also cause the at least one processor to determine that the modification includes a new identifier of at least one new machine-learning model and/or a new identifier of at least one new transaction service. The program instructions may further cause the at least one processor to regenerate the at least one shadow testing environment to operate the at least one new transaction service and/or use the at least one new machine-learning model.

In some non-limiting embodiments or aspects, the program instructions further may cause the at least one processor to, in response to determining that the at least one new transaction service and/or the at least one new machine-learning model has not yet been stored, prompt the user through the computer interface to provide the at least one new transaction service and/or the at least one new machine-learning model.

In some non-limiting embodiments or aspects, the program instructions may cause the at least one processor to receive, at a transaction service provider system, a plurality of transaction authorization requests including the at least one transaction authorization request. The program instructions may also cause the at least one processor to replicate, in a respective shadow testing environment of the at least one shadow testing environment, each of the plurality of transaction authorization requests that is associated with a transaction service of the at least one testing policy.

In some non-limiting embodiments or aspects, generating the at least one shadow testing environment may include identifying a set of computer resources available for operating shadow testing environments. Generating the at least one shadow testing environment may also include determining a resource requirement of the at least one testing policy. Generating the at least one shadow testing environment may further include selecting, based at least partly on the resource requirement, a subset of computer resources to operate the at least one shadow testing environment. Generating the at least one shadow testing environment may further include initiating the at least one shadow testing environment using the subset of computer resources.

In some non-limiting embodiments or aspects, the program instructions may cause the at least one processor to, in response to detecting a modification of the at least one testing policy, determine, based on the modification, a new resource requirement of the at least one testing policy. The program instructions may also cause the at least one processor to select, based at least partly on the new resource requirement, a new subset of computer resources to operate the at least one shadow testing environment. The program instructions may also cause the at least one processor to initiate the at least one shadow testing environment using the new subset of computer resources.

Other non-limiting embodiments or aspects of the present disclosure will be set forth in the following numbered clauses:

Clause 1: A computer-implemented method comprising: storing, with at least one processor and in a database, at least one testing policy comprising an identifier of at least one machine-learning model and an identifier of at least one transaction service; generating, with at least one processor, at least one shadow testing environment operating the at least one transaction service using the at least one machine-learning model; receiving, with at least one processor at a transaction service provider system, at least one transaction authorization request comprising transaction data of at least one transaction associated with at least one payment device; identifying, with at least one processor, the at least one transaction service associated with the at least one transaction based on a parameter of the transaction data; determining, with at least one processor, the at least one shadow testing environment associated with the at least one transaction service; and replicating, with at least one processor, the transaction data in the at least one shadow testing environment as input for testing the at least one transaction service using the at least one machine-learning model.

Clause 2: The method of clause 1, further comprising: detecting, with at least one processor, a modification of the at least one testing policy by a user through a computer interface; determining, with at least one processor, that the modification comprises a new identifier of at least one new machine-learning model and/or a new identifier of at least one new transaction service; and regenerating, with at least one processor, the at least one shadow testing environment to operate the at least one new transaction service and/or use the at least one new machine-learning model.

Clause 3: The method of clause 1 or 2, further comprising, in response to determining that the at least one new transaction service and/or the at least one new machine-learning model has not yet been stored, prompting, with at least one processor, the user through the computer interface to provide the at least one new transaction service and/or the at least one new machine-learning model.

Clause 4: The method of any of clauses 1-3, further comprising: receiving, with at least one processor at the transaction service provider system, a plurality of transaction authorization requests comprising the at least one transaction authorization request; and replicating, with at least one processor in a respective shadow testing environment of the at least one shadow testing environment, each of the plurality of transaction authorization requests that is associated with a transaction service of the at least one testing policy.

Clause 5: The method of any of clauses 1-4, wherein replication of a given transaction authorization request occurs in real-time with processing of the given transaction authorization request by the transaction service provider system.

Clause 6: The method of any of clauses 1-5, wherein generating the at least one shadow testing environment further comprises: identifying, with at least one processor, a set of computer resources available for operating shadow testing environments; determining, with at least one processor, a resource requirement of the at least one testing policy; selecting, with at least one processor based at least partly on the resource requirement, a subset of computer resources to operate the at least one shadow testing environment; and initiating, with at least one processor, the at least one shadow testing environment using the subset of computer resources.

Clause 7: The method of any of clauses 1-6, further comprising, in response to detecting a modification of the at least one testing policy: determining, with at least one processor and based on the modification, a new resource requirement of the at least one testing policy; selecting, with at least one processor based at least partly on the new resource requirement, a new subset of computer resources to operate the at least one shadow testing environment; and initiating, with at least one processor, the at least one shadow testing environment using the new subset of computer resources.

Clause 8: A system comprising a server comprising at least one processor, the server being programmed and/or configured to: store, in a database, at least one testing policy comprising an identifier of at least one machine-learning model and an identifier of at least one transaction service; generate at least one shadow testing environment operating the at least one transaction service using the at least one machine-learning model; receive, at a transaction service provider system, at least one transaction authorization request comprising transaction data of at least one transaction associated with at least one payment device; identify the at least one transaction service associated with the at least one transaction based on a parameter of the transaction data; determine the at least one shadow testing environment associated with the at least one transaction service; and replicate the transaction data in the at least one shadow testing environment as input for testing the at least one transaction service using the at least one machine-learning model.

Clause 9: The system of clause 8, wherein the server is further programmed and/or configured to: detect a modification of the at least one testing policy by a user through a computer interface; determine that the modification comprises a new identifier of at least one new machine-learning model and/or a new identifier of at least one new transaction service; and regenerate the at least one shadow testing environment to operate the at least one new transaction service and/or use the at least one new machine-learning model.

Clause 10: The system of clause 8 or 9, wherein the server is further programmed and/or configured to, in response to determining that the at least one new transaction service and/or the at least one new machine-learning model has not yet been stored, prompt the user through the computer interface to provide the at least one new transaction service and/or the at least one new machine-learning model.

Clause 11: The system of any of clauses 8-10, wherein the server is further programmed and/or configured to: receive, at the transaction service provider system, a plurality of transaction authorization requests comprising the at least one transaction authorization request; and replicate, in a respective shadow testing environment of the at least one shadow testing environment, each of the plurality of transaction authorization requests that is associated with a transaction service of the at least one testing policy.

Clause 12: The system of any of clauses 8-11, wherein replication of a given transaction authorization request occurs in real-time with processing of the given transaction authorization request by the transaction service provider system.

Clause 13: The system of any of clauses 8-12, wherein generating the at least one shadow testing environment further comprises: identifying a set of computer resources available for operating shadow testing environments; determining a resource requirement of the at least one testing policy; selecting, based at least partly on the resource requirement, a subset of computer resources to operate the at least one shadow testing environment; and initiating the at least one shadow testing environment using the subset of computer resources.

Clause 14: The system of any of clauses 8-13, wherein the server is further programmed and/or configured to, in response to detecting a modification of the at least one testing policy: determine, based on the modification, a new resource requirement of the at least one testing policy; select, based at least partly on the new resource requirement, a new subset of computer resources to operate the at least one shadow testing environment; and initiate the at least one shadow testing environment using the new subset of computer resources.

Clause 15: A computer program product comprising at least one non-transitory computer-readable medium including program instructions that, when executed by at least one processor, cause the at least one processor to: store, in a database, at least one testing policy comprising an identifier of at least one machine-learning model and an identifier of at least one transaction service; generate at least one shadow testing environment operating the at least one transaction service using the at least one machine-learning model; receive, at a transaction service provider system, at least one transaction authorization request comprising transaction data of at least one transaction associated with at least one payment device; identify the at least one transaction service associated with the at least one transaction based on a parameter of the transaction data; determine the at least one shadow testing environment associated with the at least one transaction service; and replicate the transaction data in the at least one shadow testing environment as input for testing the at least one transaction service using the at least one machine-learning model.

Clause 16: The computer program product of clause 15, wherein the program instructions further cause the at least one processor to: detect a modification of the at least one testing policy by a user through a computer interface; determine that the modification comprises a new identifier of at least one new machine-learning model and/or a new identifier of at least one new transaction service; and regenerate the at least one shadow testing environment to operate the at least one new transaction service and/or use the at least one new machine-learning model.

Clause 17: The computer program product of clause 15 or 16, wherein the program instructions further cause the at least one processor to, in response to determining that the at least one new transaction service and/or the at least one new machine-learning model has not yet been stored, prompt the user through the computer interface to provide the at least one new transaction service and/or the at least one new machine-learning model.

Clause 18: The computer program product of any of clauses 15-17, wherein the program instructions further cause the at least one processor to: receive, at the transaction service provider system, a plurality of transaction authorization requests comprising the at least one transaction authorization request; and replicate, in a respective shadow testing environment of the at least one shadow testing environment, each of the plurality of transaction authorization requests that is associated with a transaction service of the at least one testing policy.

Clause 19: The computer program product of any of clauses 15-18, wherein generating the at least one shadow testing environment further comprises: identifying a set of computer resources available for operating shadow testing environments; determining a resource requirement of the at least one testing policy; selecting, based at least partly on the resource requirement, a subset of computer resources to operate the at least one shadow testing environment; and initiating the at least one shadow testing environment using the subset of computer resources.

Clause 20: The computer program product of any of clauses 15-19, wherein the program instructions further cause the at least one processor to, in response to detecting a modification of the at least one testing policy: determine, based on the modification, a new resource requirement of the at least one testing policy; select, based at least partly on the new resource requirement, a new subset of computer resources to operate the at least one shadow testing environment; and initiate the at least one shadow testing environment using the new subset of computer resources.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which:

FIG. 5 is a process diagram of one embodiment or aspect of a system and method for operating dynamic shadow testing environments.

DETAILED DESCRIPTION

Figure 1:
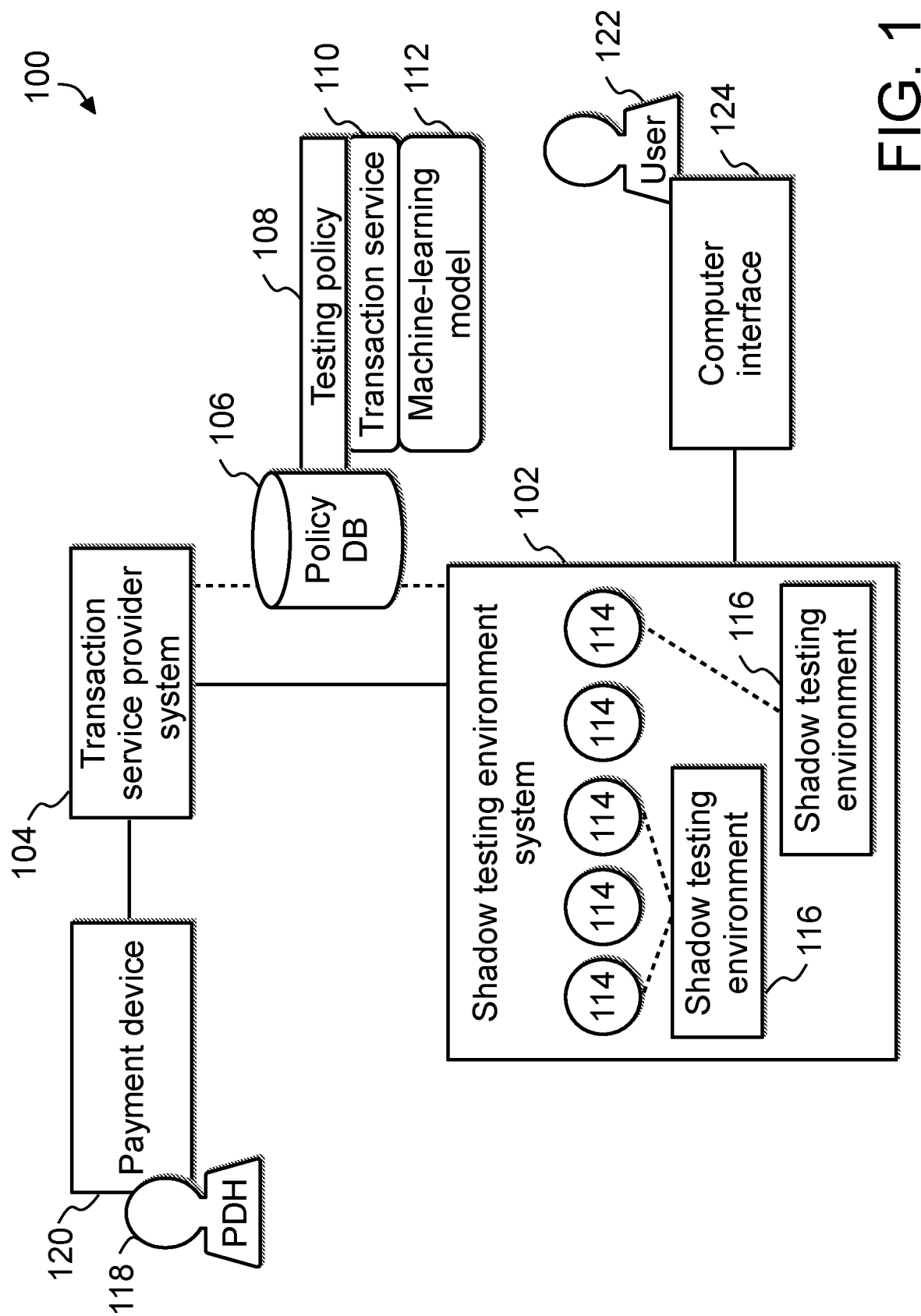
FIG. 1 is a schematic diagram of one embodiment or aspect of a system and method for operating dynamic shadow testing environments.

For purposes of the description hereinafter, the terms "upper", "lower", "right", "left", "vertical", "horizontal", "top", "bottom", "lateral", "longitudinal," and derivatives thereof shall relate to non-limiting embodiments as they are oriented in the drawing figures. However, it is to be understood that non-limiting embodiments may assume various alternative variations and step sequences, except where expressly specified to the contrary. It is also to be understood that the specific devices and processes illustrated in the attached drawings, and described in the following specification, are simply exemplary embodiments. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partly on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. Any known electronic communication protocols and/or algorithms may be used such as, for example, transmission control protocol/internet protocol (TCP/IP) (including hypertext transfer protocol (HTTP) and other protocols), wireless local-area network (WLAN) (including 802.11 and other radio frequency-based protocols and methods), analog transmissions, cellular networks (e.g., Global System for Mobile Communications (GSM), Code Division Multiple Access (CDMA), Long-Term Evolution (LTE®), Worldwide Interoperability for Microwave Access (WiMAX®), etc.), and/or the like. It will be appreciated that numerous other arrangements are possible.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a point-of-sale (POS) system, and/or any other device or system capable of communicating with a network.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "payment device" may refer to a portable financial device, an electronic payment device, a payment card (e.g., a credit or debit card), a gift card, a smartcard, smart media, a payroll card, a healthcare card, a wrist band, a machine-readable medium containing account information, a keychain device or fob, a radio-frequency identification (RFID) transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications, a token service executing one or more software applications, and/or the like. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical payment instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "acquirer institution" may refer to an entity licensed and/or approved by the transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a bank. As used herein, the term "acquirer system" may refer to one or more computer systems, computer devices, software applications, and/or the like operated by or on behalf of an acquirer institution.

As used herein, the terms "authenticating system" and "authentication system" may refer to one or more computing devices that authenticate a user and/or an account, such as but not limited to a transaction processing system, merchant system, issuer system, payment gateway, a third-party authenticating service, and/or the like.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "server" or "server computer" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a merchant's POS system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to a system, method, and computer program product for operating dynamic shadow testing environments. The described arrangement of network architecture and components therein is configured to provide an enhanced means of integrating platform shadowing and model shadowing seamlessly, with little to no effect on a production environment. The described system and methods can dynamically provision and shrink shadow environments to use computer resources more efficiently. Modifications to testing policies may be detected in real-time with changes, triggering automatic and optimized reprovisioning of computer resources. Furthermore, the described systems and methods can execute shadow testing with minimal manual input, optionally requiring user input of new service versions and/or new models into a shadow deployment repository and definition of shadowed testing policy. Live data may be mirrored in one or more shadow testing environments simultaneously, or substantially simultaneously, with the processing of the live data, providing a pseudo-production environment for testing services and models. Such an implementation improves accuracy of testing of computer-implemented services, and decreases the security and data loss risks associated of testing services on live data.

With specific reference to FIG. 1, and in some non-limiting embodiments or aspects, provided is a system 100 for operating dynamic shadow testing environments. The system 100 includes a shadow testing environment system, including one or more servers, for generating, operating, managing, and evaluating one or more shadow testing environments 116. A shadow testing environment may include software configured to test a process in a virtual environment, as if the tested process were operating on live data. Shadow testing environments may be operated using one or more computing resources 114. A computer resource 114 may include one or more processors and/or data storage mediums for operating a shadow testing environment. Multiple shadow testing environments 116 may use the same or different computer resources 114.

The system 100 also includes a transaction service provider system 104. The transaction service provider system 104 may receive transaction data of one or more transactions completed by payment devices 120 of one or more payment device holders 118. The shadow testing environment system 102 may partially or completely include the transaction service provider system 104, and the transaction service provider system 104 may partially or completely include the shadow testing environment system 102. The transaction service provider system 104 may identify transactions, based on stored testing policies 108, during processing of corresponding transaction authorization requests, to be replicated in one or more shadow testing environments 116. The shadow testing environment system 102 may also receive transaction data from the transaction service provider system 104 and determine one or more transactions to be replicated in one or more shadow testing environments 116. A shadow testing environment 116 and/or testing policy 108 may be identified as associated with a given transaction based on one or more parameters of transaction data (e.g., payment device identifier, payment device holder identifier, transaction amount, transaction time, transaction type, payment device type, merchant identifier, merchant type, transaction description, and/or the like) compared to one or more parameters of a testing policy 108, including transaction service 110, machine-learning model 112, triggering values or ranges of transaction data, and/or the like.

The transaction service provider system 104 and/or the shadow testing environment system 102 may be communicatively connected to a policy database 106. The policy database 106 may be programmed and/or configured to store one or more testing policies 108. A testing policy 108 may be a stored data record associated with a transaction service 110 to be tested in a shadow testing environment 116. In some non-limiting embodiments or aspects, if an actively running version of a service is version 1.1, and new versions 1.2 and 1.3 are intended to be tested on 70% and 30% of actively processed data, respectively, then the testing policy may be defined as: {"active": {"1 .1":100}, "test": [{"1.2": 70}, {"1.3":30}]}. Transaction services 110 may include any computer-implemented service with one or more actions triggered by one or more parameters of a transaction, including, but not limited to, fraud detection services, advertising services, consumer alert services, reward services, credit services, behavioral biometrics services, orchestration services, aggregation services, profile services, transformation services, model services, model serving services, decision services, and/or the like. Transaction services 110 may be carried out at least partly by one or more machine-learning models 112. Testing policies 108 may be stored in a policy database 106 in relation to one or more identifiers of transaction services 110 and one or more identifiers of machine-learning models 112. Transaction services 110 may be delineated by one or more versions of the same transaction service 110, and may be differentiated by one or more parameters, including associated machine-learning model 112. The policy database 106 or another database may be used to store the code/script for executing transaction services 110 using machine-learning models 112. In some non-limiting embodiments or aspects, machine-learning models 112 may include, but are not limited to, Smart Stand-in-Processing (STIP) models, Visa Deep Authorization (VDA) models, and/or the like. Performance data of a testing policy 108 in a shadow testing environment 116 may be stored in the policy database 106 or another database.

A user 122 may interact with a computer interface 124 communicatively connected to the shadow testing environment system 102 to input one or more testing policies 108 into the policy database 106. A user 122 may view, edit, add, and/or delete testing policies 108 stored in the policy database 106, and individual users 122 may have variably preset permissions for such actions. The user 122 may modify a testing policy 108, such as by modifying an identifier of a transaction service 110 to be tested and/or an identifier of a machine-learning model 112. An identifier of a transaction service 110 may be specific to a version of a transaction service 110. The shadow testing environment system 102 may detect a modification of the testing policy 108, and in particular, a modification of the identifiers of transaction service 110 and machine-learning model 112. If the shadow testing environment system 102 has access to the code/script for executing a transaction service 110 using a machine-learning model 112 in a shadow testing environment 116, the shadow testing environment system 102 may proceed to generate a shadow testing environment 116 after a testing policy 108 is input/modified. If the code/script for executing a transaction service 110 and/or machine-learning model 112 was not previously stored, the shadow testing environment system 102 may prompt a user 122 (e.g., the user 122 that modified the relevant testing policy 108) via a computer interface 124 to provide the missing transaction service and/or machine-learning model implementation code/script.

A testing policy 108 may further be associated with a time period for execution in shadow testing environments. The shadow testing environment system 102 may automatically generate one or more shadow testing environments 116 for a given testing policy 108 at the start of a time period, and may halt a shadow testing environment 116 at the start of a time period. Performance data of a testing policy 108 during a time period may be stored in the policy database 106 or another database.

The shadow testing environment system 102 may identify one or more computer resources 114 available for operating shadow testing environments 116. An allocation of available computer resources 114 may be predefined and static, or an allocation of available computer resources 114 may be dynamic and determined based on parameters such as connectivity, network usage, reliability, latency, and the like. The shadow testing environment system 102 may determine a resource requirement of a given testing policy 108. Resource requirements may be determined from, but are not limited to, central processing unit (CPU) requirements, graphics processing unit (GPU) requirements, in-memory caching requirements, and/or the like. A resource requirement may include an estimate of processor memory, process speed, data storage, latency, and/or the like based on one or more parameters of a testing policy 108. For example, a testing policy 108 may be associated with a fraud detection transaction service 110 that requires a convolutional neural network machine-learning model 112, which may need a training set of 100,000 transactions of a given type and a testing set of 200,000 transactions of a same type over a two-week sample time period. Based on such testing policy 108 parameters, the shadow testing environment system 102 may select a subset of computer resources 114 having sufficient processing, communication, and data storage capacity for operating a shadow testing environment 116 running the associated transaction service 110, as if the transaction service 110 were evaluating live transaction data and not replicated transaction data in the shadow testing environment 116. Once a subset of computer resources 114 is selected, the shadow testing environment system 102 may initiate the shadow testing environment 116, begin replicating transaction data associated with the testing policy 108, and recording performance data of the testing policy's 108 transaction service 110 and machine-learning model 112.

It will further be appreciated that while a shadow testing environment 116 is in operation for a given testing policy 108, said testing policy 108 may be modified by a user 122 to use a new version of a transaction service 110, a new machine-learning model 112, new parameters for replicated transaction data, and/or the like. The shadow testing environment system 102 may detect the modification to the testing policy 108 and determine a new resource requirement of the updated testing policy 108. The shadow testing environment system 102 may select a new subset of computer resources 114 based on the updated testing policy 108 and initiate, e.g., redeploy, the shadow testing environment 116 to test the updated testing policy 108.

Figure 2:
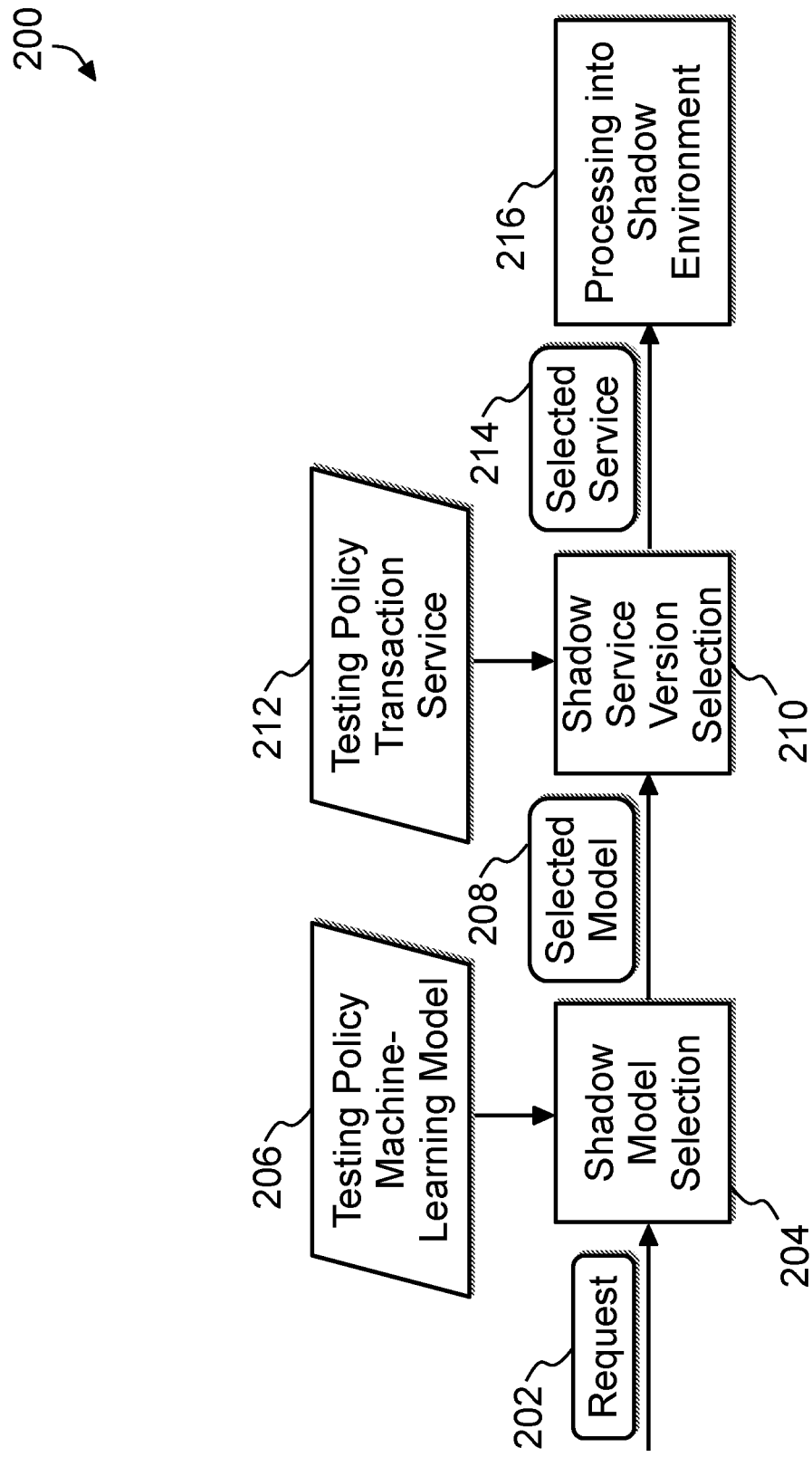
FIG. 2 is a flow diagram of one embodiment or aspect of a system and method for operating dynamic shadow testing environments.

With specific reference to FIG. 2, and in some non-limiting embodiments or aspects, provided is a replication process 200 for operating dynamic shadow testing environments. The replication process 200 may be executed by a shadow testing environment system, a transaction service provider system, another server, or any combination thereof. In step 202, the transaction service provider system may receive a transaction authorization request for a transaction. Transaction data of the transaction may be forwarded to the shadow testing environment system. The shadow testing environment system may evaluate one or more parameters of the transaction data to determine if the transaction should be replicated in one or more shadow testing environments. Testing policies may be selected based on one or more associated transaction characteristics, including, but not limited to, transaction type, transaction location, transaction amount, transaction data, merchant identifier, merchant type, and/or the like. For a transaction that is associated with at least one testing policy, the shadow testing environment system may carry out model selection in step 204. Based on the testing policy (e.g., machine-learning model identifier) and/or one or more transaction data parameters, the shadow testing environment system may identify an associated machine learning model 206. After a selected model 208 is identified, the shadow testing environment system may select a version of a transaction service in step 210. Based on the testing policy (e.g., transaction service identifier) and/or one or more transaction data parameters, the shadow testing environment system may identify a transaction service 212. After a selected service 214 is identified, the shadow testing environment system may process the transaction into a shadow testing environment in step 216.

If a shadow testing environment for a given selected model 208 and selected service 214 has already been initiated, transaction data of a triggering request 202 may be replicated in the shadow testing environment. If the transaction is associated with a selected model 208 and selected service 214 for which no shadow testing environment is operating, the shadow testing environment system may initiate a new shadow testing environment. While the aforementioned replication process 200 includes a step-by-step identification of a selected model 208 and selected service 214 prior to processing into a shadow environment 216, it will be appreciated that other parameters besides model and service may be used for associating transactions with testing policies and/or shadow testing environments.

Figure 3:
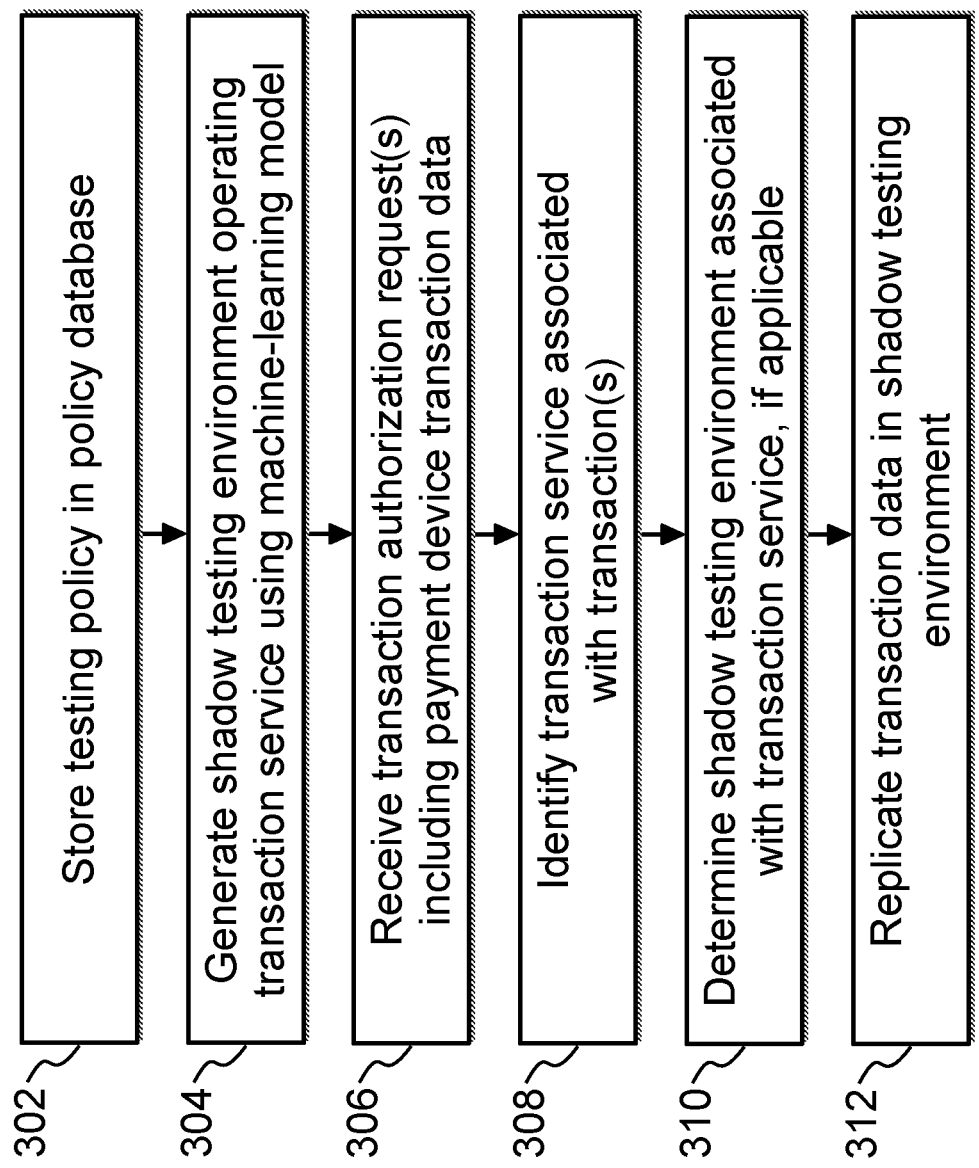
FIG. 3 is a process diagram of one embodiment or aspect of a system and method for operating dynamic shadow testing environments.

With specific reference to FIG. 3, and in some non-limiting embodiments or aspects, provided is a method 300 for operating dynamic shadow testing environments. One or more steps of the method 300 may be executed by a shadow testing environment system, transaction service provider system, another server, or a combination thereof. In step 302, the shadow testing environment system may store one or more testing policies in a policy database. Testing policies may include identifiers of one or more machine-learning models and identifiers of one or more transaction services. Testing policies may also include definitions (e.g., code, script, parameters, etc.) of machine-learning models and/or transaction services. In step 304, the shadow testing environment system may generate one or more shadow testing environments using one or more computer resources. A shadow testing environment operates one or more transaction services using one or more machine-learning models. In step 306, the transaction service provider system may receive one or more transaction authorization requests including transaction data of one or more transactions associated with one or more payment devices. For example, when a payment device interacts with a merchant point-of-sale terminal to complete a transaction, a transaction authorization request is generated and sent to the transaction service provider system for processing of the transaction. Transaction data may include transaction identifier, transaction amount, transaction type, transaction time, merchant type, merchant identifier, merchant location, payment device identifier, user identifier, transaction description, and/or the like. Steps 306 to 312 may be executed for a plurality of transaction authorization requests, and data of one or more transactions of the plurality of transaction authorization requests may be replicated in respective shadow testing environments based on associated transaction services, machine-learning models, and/or testing policies associated with said transactions. Furthermore, replication, in step 312, may occur in real-time with processing a given transaction authorization request by the transaction service provider system.

In step 308, the shadow testing environment system may identify one or more transaction services associated with one or more transactions based on a parameter of the transaction data. For example, the transaction may be for a credit transaction and an amount satisfying a threshold set by an issuer of the payment device used for the transaction. Such a transaction may implicate a fraud detection transaction service that is designated in a stored testing policy. The shadow testing environment system may additionally, or alternatively, identify a machine-learning model associated with the transaction or a testing policy associated with the transaction based on one or more transaction parameters. In step 310, the shadow testing environment system may determine a shadow testing environment associated with the transaction service. The shadow testing environment may additionally or alternatively identify a shadow testing environment associated with a machine-learning model and/or testing policy. A determined shadow testing environment may be generated in response to the identification of a relevant transaction, or a shadow testing environment may already be running at the time of receipt of a transaction. In step 312, shadow testing environment system may replicate a portion or all of transaction data in a shadow testing environment as an input for testing the one or more transaction services using the one or more machine-learning models. For example, the transaction data may be replicated in a shadow testing environment for a fraud detection transaction service, which may appear to the transaction service to be a live transaction being processed, and which may trigger one or more fraud prevention countermeasures in the testbed of the shadow testing environment. In such a way, transaction services may be tested and evaluated without interacting with live data or taking live actions while a transaction service has not yet been fully tested.

Figure 4:
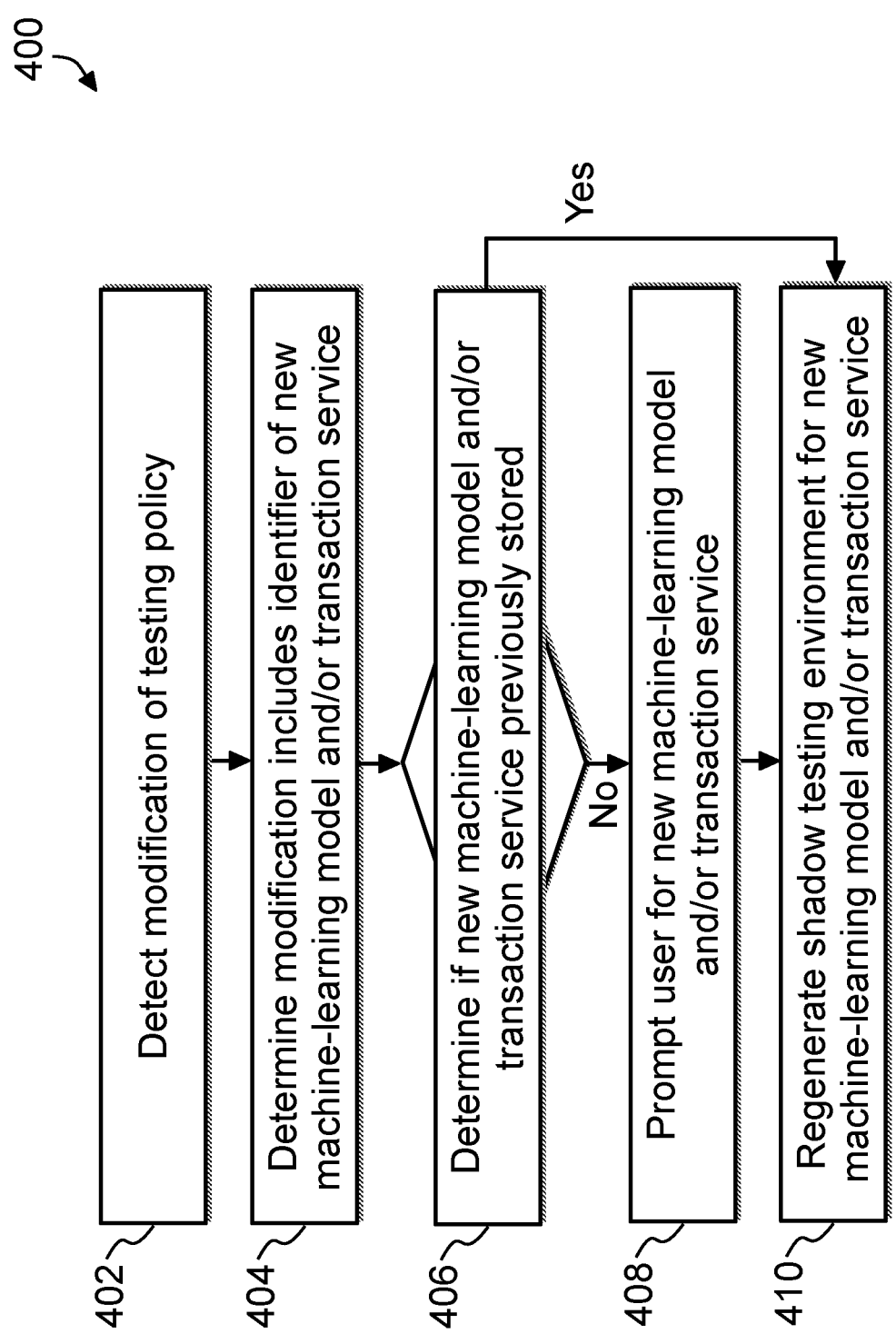
FIG. 4 is a process diagram of one embodiment or aspect of a system and method for operating dynamic shadow testing environments.

With specific reference to FIG. 4, and in some non-limiting embodiments or aspects, provided is a method 400 for operating dynamic shadow testing environments. One or more steps of the method 400 may be executed by a shadow testing environment system, a transaction service provider system, another server, or a combination thereof. In step 402, the shadow testing environment system may detect one or more modifications of one or more stored testing policies. In step 404, the shadow testing environment system may determine that the modification includes a new identifier of one or more machine-learning models and/or a new identifier of one or more transaction services. It will be appreciated that in the case of a plurality of models or services, a plurality of identifiers may be modified. Alternatively, or additionally, definitions (e.g., code, script, parameters, etc.) of one or more machine-learning models and/or one or more transaction services may be modified. Modifications may be executed by a user (e.g., management personnel) interacting with the shadow testing environment system via a computer interface (e.g., a web portal executing an application programming interface).

In step 406, the shadow testing environment system may determine if one or more new machine-learning models and/or transaction services, identified by new identifiers or definitions, are implicated, and if so, if said new model(s) or new service(s) were previously stored. Step 406 may additionally, or alternatively, determine if one or more new models or services are accessible by a processor of the shadow testing environment system. If one or more new machine-learning models and/or transaction services are not stored or available for retrieval, the shadow testing environment system may, in step 408, prompt a user via a computer interface for the one or more new machine-learning models and/or transaction services. The user may then use the computer interface to identify the storage location of the one or more new models and/or services. The user may also use the computer interface to upload/communicate the definitions (e.g., code, script, parameters, etc.) of one or more new models and/or services. Once one or more new models and/or services are stored and available, either originally after step 406 or after prompting a user in step 408, the shadow testing environment system may regenerate one or more shadow testing environments to operate the one or more new machine-learning models and/or transaction services. Steps 402 to 410 may be carried out while new transactions are continually processed at a transaction service provider system, and may dynamically allocate regenerated shadow testing environments to computer resources according to resource availability and requirements.

With specific reference to FIG. 5, and in some non-limiting embodiments or aspects, provided is a method 500 for operating dynamic shadow testing environments. One or more steps of method 500 may be executed by a shadow testing environment system, a transaction service provider system, another server, or a combination thereof. In step 502, the shadow testing environment system may identify a set of computer resources available for operating shadow testing environments. The set of computer resources may be one or more computer resources available to the shadow testing environment system, which may be allocated in whole or part to one or more shadow testing environments. In step 504, the shadow testing environment system may determine a resource requirement (e.g., processing memory, data storage, bit rate, latency, uptime, etc.) for each or all of one or more testing policies. In step 506, the shadow testing environment system may, based on the determined resource requirement, select a subset of computer resources to operate the one or more shadow testing environments. The subset of computer resources may be part or all of the set of computer resources. In step 508, the shadow testing environment system may initiate one or more shadow testing environments using the subset of computer resources. Any given computer resource may or may not be used for more than one shadow testing environment, and any given shadow testing environment may require one or more computer resources.

In step 510, the shadow testing environment system may detect a modification of one or more testing policy, which may include a change to identifiers or definitions (e.g., code, script, parameters) of one or more machine-learning models and/or transaction services. In response to the detection, the shadow testing environment may repeat steps 504 to 508 to determine a new resource requirement of the modified testing policy, select a new subset of computer resources to operate one or more shadow testing environments of the modified testing policy, and initiate (e.g., restart, regenerate, etc.) the one or more shadow testing environments on the new subset of computer resources. It will be appreciated that a new resource requirement may be the same or different from a previous resource requirement. It will also be appreciated that a new subset of computer resources may be the same or different from a previous selected subset of computer resources. Steps 510 and 504 to 508 may be repeated upon detection of a modification of one or more testing policies.

With further reference to the foregoing figures, and in further non-limiting embodiments or aspects, consider the following example execution workflow. A user, such as a management personnel, may access a computing device and input their security credentials to view a computer interface for communicating with a shadow testing environment system. The user may interact with a series of web forms to define a new testing policy having a specific version of transaction service, such as a fraud detection service, that is operated using a specific machine-learning model, such as a behavioral biometrics model. The shadow testing environment system may store the parameters of the testing policy in a policy database, which may include identifiers and/or definitions of the model and service. The definitions (e.g., code, script, etc.) of the fraud detection service and/or behavioral biometrics model may be stored in the same database or a separate database to act as a definition repository.

The shadow testing environment system may then identify a resource requirement of the input testing policy. The testing policy and/or definitions of the service and/or model, for example, may have parameters specifying card-not-present transaction type, for credit payment devices, for amounts greater than $10, completed at a time within an hour of a prior transaction of the payment device, over a one month time period. Based on one or more parameters of the testing policy, service, and/or model, the shadow testing environment system may identify and allocate one or more computer resources for the execution of the service and model. For example, the shadow testing environment may determine a data storage requirement of 20 terabytes (TB), an input rate requirement of 10 gigabit (Gb), and a processing requirement of 128 gigabytes (GB) of random access memory (RAM) distributed over 32 processor cores. Based on the determined resource requirement, the shadow testing environment may allocate one or more computer resources (e.g., data storage and processor server arrays) of the total available computer resources to run the new shadow testing environment. After computer resources are allocated, the shadow testing environment may be initiated and the service and model of the corresponding testing policy may be activated, where testing may begin.

As live transaction data is received at a transaction service provider system, the transaction service provider system and/or shadow testing environment system may determine if any given transaction is relevant to a testing policy being run, or intended to be run, on a shadow testing environment. For the above example fraud detection service, a new transaction may satisfy one or more parameters of the testing policy, service, and/or model, which may identify the transaction as relevant to the testing policy. The transaction data may then be replicated in the operating shadow testing environment, as if the transaction data was live production data. In such a manner, the fraud detection service being tested may interact with the replicated transaction data and trigger actions in the shadow testing environment.

With further reference to the foregoing figures, and in further non-limiting embodiments or aspects, the shadow testing environment system may include a number of program layers for executing the described steps. For example, the shadow testing environment system may include a control layer for defining platform and model experimentation policies. The shadow testing environment system may include a resource provisioning service to create experimentation environments based on testing policies. The shadow testing environment system may include a policy execution engine to add code/script (e.g., http headers) for individual transactions and replicate transactions in shadow testing environments based on testing policies. The shadow testing environment system may also include a data routing layer to forward the original and/or replicated transactions to services and models. It will further be appreciated that while the services described above have been described principally in the transaction context, the systems and methods for generating and operating shadow testing environments may be useful for non-transaction based live data flows, services, machine-learning models, and testing policies.

Although the disclosure has been described in detail for the purpose of illustration based on what is currently considered to be the most practical and non-limiting embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method comprising:
generating, with at least one processor, at least one shadow testing environment operating at least one transaction service and using at least one machine-learning model, the at least one transaction service having at least one action triggered by one or more parameters of a payment transaction;
receiving, with the at least one processor at a transaction processing system of a transaction service provider in an electronic payment processing network, a plurality of transaction authorization requests, each transaction authorization request of the plurality of transaction authorization requests comprising transaction data of a payment transaction associated with a payment device, wherein the transaction processing system is configured to receive the plurality of transaction authorization requests from at least one merchant and process payment transactions associated with the plurality of transaction authorization requests as said payment transactions are initiated by at least one point-of-sale terminal of the at least one merchant;
determining, with the at least one processor, a respective shadow testing environment of the at least one shadow testing environment associated with each transaction authorization request of the plurality of transaction authorization requests; and
replicating, with the at least one processor in real-time with processing payment for each payment transaction associated with each transaction authorization request of the plurality of transaction authorization requests, the transaction data of said each transaction authorization request in the respective shadow testing environment associated with said each transaction authorization request to produce replicated transaction data, wherein the replicated transaction data is used as input for testing the at least one transaction service.

2. The method of claim 1, further comprising storing, with the at least one processor and in a database, at least one testing policy comprising an identifier of the at least one machine-learning model and an identifier of the at least one transaction service.

3. The method of claim 2, further comprising:
 detecting, with the at least one processor, a modification of the at least one testing policy by a user through a computer interface;
 determining, with the at least one processor, that the modification comprises at least one of a new identifier of at least one new machine-learning model and a new identifier of at least one new transaction service; and
 regenerating, with the at least one processor, the at least one shadow testing environment to perform at least one of the following: operate the at least one new transaction service, and use the at least one new machine-learning model.

4. The method of claim 3, further comprising, in response to determining that at least one of the at least one new transaction service and the at least one new machine-learning model has not yet been stored, prompting, with the at least one processor, the user through the computer interface to provide at least one of the at least one new transaction service and the at least one new machine-learning model.

5. The method of claim 1, wherein determining the respective shadow testing environment of the at least one shadow testing environment associated with each transaction authorization request of the plurality of transaction authorization requests further comprises identifying a transaction service associated with a parameter of the transaction data of said each transaction authorization request.

6. The method of claim 2, wherein generating the at least one shadow testing environment further comprises:
 identifying, with the at least one processor, a set of computer resources available for operating shadow testing environments;
 determining, with the at least one processor, a resource requirement of the at least one testing policy;
 selecting, with the at least one processor based at least partly on the resource requirement, a subset of computer resources to operate the at least one shadow testing environment; and
 initiating, with the at least one processor, the at least one shadow testing environment using the subset of computer resources.

7. The method of claim 6, further comprising, in response to detecting a modification of the at least one testing policy:
 determining, with the at least one processor and based on the modification, a new resource requirement of the at least one testing policy;
 selecting, with the at least one processor based at least partly on the new resource requirement, a new subset of computer resources to operate the at least one shadow testing environment; and
 initiating, with the at least one processor, the at least one shadow testing environment using the new subset of computer resources.

8. A system comprising a server comprising at least one processor, the server being at least one of programmed and configured to:
 generate at least one shadow testing environment operating at least one transaction service and using at least one machine-learning model, the at least one transaction service having at least one action triggered by one or more parameters of a payment transaction;
 receive, at a transaction processing system of a transaction service provider in an electronic payment processing network, a plurality of transaction authorization requests, each transaction authorization request of the plurality of transaction authorization requests comprising transaction data of a payment transaction associated with a payment device, wherein the transaction processing system is configured to receive the plurality of transaction authorization requests from at least one merchant and process payment transactions associated with the plurality of transaction authorization requests as said payment transactions are initiated by at least one point-of-sale terminal of the at least one merchant;
 determine a respective shadow testing environment of the at least one shadow testing environment associated with each transaction authorization request of the plurality of transaction authorization requests; and
 replicate, in real-time with processing payment for each payment transaction associated with each transaction authorization request of the plurality of transaction authorization requests, the transaction data of said each transaction authorization request in the respective shadow testing environment associated with said each transaction authorization request to produce replicated transaction data, wherein the replicated transaction data is used as input for testing the at least one transaction service.

9. The system of claim 8, wherein the server is further at least one of programmed and configured to store, in a database, at least one testing policy comprising an identifier of the at least one machine-learning model and an identifier of the at least one transaction service.

10. The system of claim 9, wherein the server is further at least one of programmed and configured to:
 detect a modification of the at least one testing policy by a user through a computer interface;
 determine that the modification comprises at least one of a new identifier of at least one new machine-learning model and a new identifier of at least one new transaction service; and
 regenerate the at least one shadow testing environment to perform at least one of the following: operate the at least one new transaction service, and use the at least one new machine-learning model.

11. The system of claim 10, wherein the server is further at least one of programmed and configured to, in response to determining that at least one of the at least one new transaction service and the at least one new machine-learning model has not yet been stored, prompt the user through the computer interface to provide at least one of the at least one new transaction service and the at least one new machine-learning model.

12. The system of claim 8, wherein determining the respective shadow testing environment of the at least one shadow testing environment associated with each transaction authorization request of the plurality of transaction authorization requests further comprises identifying a transaction service associated with a parameter of the transaction data of said each transaction authorization request.

13. The system of claim 9, wherein generating the at least one shadow testing environment further comprises:
 identifying a set of computer resources available for operating shadow testing environments;
 determining a resource requirement of the at least one testing policy;

selecting, based at least partly on the resource requirement, a subset of computer resources to operate the at least one shadow testing environment; and initiating the at least one shadow testing environment using the subset of computer resources.

14. The system of claim 13, wherein the server is further at least one of programmed and configured to, in response to detecting a modification of the at least one testing policy:

determine, based on the modification, a new resource requirement of the at least one testing policy;

select, based at least partly on the new resource requirement, a new subset of computer resources to operate the at least one shadow testing environment; and initiate the at least one shadow testing environment using the new subset of computer resources.

15. A computer program product comprising at least one non-transitory computer-readable medium including program instructions that, when executed by at least one processor, cause the at least one processor to:

generate at least one shadow testing environment operating at least one transaction service and using at least one machine-learning model, the at least one transaction service having at least one action triggered by one or more parameters of a payment transaction;

receive, at a transaction processing system of a transaction service provider-in an electronic payment processing network, a plurality of transaction authorization requests, each transaction authorization request of the plurality of transaction authorization requests comprising transaction data of a payment transaction associated with a payment device, wherein the transaction processing system is configured to receive the plurality of transaction authorization requests from at least one merchant and process payment transactions associated with the plurality of transaction authorization requests as said payment transactions are initiated by at least one point-of-sale terminal of the at least one merchant;

determine a respective shadow testing environment of the at least one shadow testing environment associated with each transaction authorization request of the plurality of transaction authorization requests; and replicate, in real-time with processing payment for each payment transaction associated with each transaction authorization request of the plurality of transaction authorization requests, the transaction data of said each transaction authorization request in the respective shadow testing environment associated with said each transaction authorization request to produce replicated transaction data, wherein the replicated transaction data is used as input for testing the at least one transaction service.

16. The computer program product of claim 15, wherein the program instructions further cause the at least one processor to store, in a database, at least one testing policy comprising an identifier of the at least one machine-learning model and an identifier of the at least one transaction service.

17. The computer program product of claim 16, wherein the program instructions further cause the at least one processor to:

detect a modification of the at least one testing policy by a user through a computer interface;

determine that the modification comprises at least one of a new identifier of at least one new machine-learning model and a new identifier of at least one new transaction service; and regenerate the at least one shadow testing environment to perform at least one of the following: operate the at least one new transaction service, and use the at least one new machine-learning model.

18. The computer program product of claim 15, wherein determining the respective shadow testing environment of the at least one shadow testing environment associated with each transaction authorization request of the plurality of transaction authorization requests further comprises identifying a transaction service associated with a parameter of the transaction data of said each transaction authorization request.

19. The computer program product of claim 16, wherein generating the at least one shadow testing environment further comprises:

identifying a set of computer resources available for operating shadow testing environments;

determining a resource requirement of the at least one testing policy;

selecting, based at least partly on the resource requirement, a subset of computer resources to operate the at least one shadow testing environment; and initiating the at least one shadow testing environment using the subset of computer resources.

20. The computer program product of claim 19, wherein the program instructions further cause the at least one processor to, in response to detecting a modification of the at least one testing policy:

determine, based on the modification, a new resource requirement of the at least one testing policy;

select, based at least partly on the new resource requirement, a new subset of computer resources to operate the at least one shadow testing environment; and initiate the at least one shadow testing environment using the new subset of computer resources.

* * * * *